United States Patent [19]

Tsuda et al.

[11] Patent Number: 5,229,695
[45] Date of Patent: Jul. 20, 1993

[54] CONTROLLER FOR AUTOMATICALLY STOPPING MOTOR IN RESPONSE TO OVERCURRENT CONDITION

[75] Inventors: Hirokazu Tsuda; Tsutomu Saito; Takahiro Yamada, all of Toyohashi, Japan

[73] Assignee: Asmo Co., Ltd., Kosai, Japan

[21] Appl. No.: 915,917

[22] Filed: Jul. 16, 1992

[30] Foreign Application Priority Data

Jul. 17, 1991 [JP] Japan .................................. 3-177009

[51] Int. Cl.$^5$ .............................................. H02P 3/00
[52] U.S. Cl. ...................................... 318/434; 361/31; 318/471
[58] Field of Search .................. 318/434, 471; 361/24, 361/25, 27, 103, 106, 23, 31, 32; 337/66–75

[56] References Cited

U.S. PATENT DOCUMENTS

| | | | |
|---|---|---|---|
| 4,475,138 | 10/1984 | Middleman et al. | 361/106 X |
| 4,656,407 | 4/1987 | Burney | 318/434 X |
| 4,689,533 | 8/1987 | Yans | 318/471 X |
| 4,739,232 | 4/1988 | Ishimoto | 318/471 X |
| 4,761,592 | 8/1988 | Dissing et al. | 318/471 X |
| 4,983,897 | 1/1991 | Tennant | 318/434 X |
| 4,984,123 | 1/1991 | James | 337/75 X |
| 5,012,168 | 4/1991 | Dara et al. | 318/434 |

*Primary Examiner*—Jonathan Wysocki
*Attorney, Agent, or Firm*—Stetina & Brunda

[57] ABSTRACT

An automatic controller for use with a motor. A switch interconnects the motor and a power source for selectively establing an electrical connection therebetween. A relay coil is connected to the motor. When the motor is connected to the power source via the switch, the relay coil latches the switch in a steady connecting state. When increased current overdraw of the motor is sensed, a current-limiting thermistor limits or interrupts the current flow across the relay coil, to set the switch to a disconnect state and to cause the motor to stop.

15 Claims, 3 Drawing Sheets

1

CONTROLLER FOR AUTOMATICALLY STOPPING MOTOR IN RESPONSE TO OVERCURRENT CONDITION

BACKGROUND OF THE INVENTION

1. Field of the Invention

The present invention relates to a controller for automatically stopping a motor. More particularly, it relates to a controller for automatically stopping a drive motor for a power window in a vehicle.

2. Description of the Related Art

A conventional apparatus for opening and closing a glass panel such as a window, in a vehicle employs a motor having a controller 30, as shown in FIG. 4. In raising the window a control switch (not shown) inside the vehicle is digitally operated (with a finger). As a result, a switch 31 of a relay in the controller 30 is coupled to a relay contact 32. A switch 43 is coupled to a relay contact 45.

A current from a power source, hereinafter referred to as "current source", flows through the relay contact 32, a motor 33, the relay contact 45 and a resistor R1, as indicated by 33, the relay contact 45 and a resistor R1, as indicated by solid line arrows in FIG. 4. Consequently, the motor 33 rotates in a predetermined direction in order to raise the window. At this time, a voltage across the resistor R1 is input to a comparator 34, where it is compared with a reference voltage LO of a first reference voltage circuit 35.

Since the reference voltage LO is set higher than the voltage across the resistor R1, the output voltage $V_{out1}$ of the comparator 34 becomes an L (low) level. This L-level is output, via a resistor R2, to a comparator 36 where it is compared with a reference voltage HI of a second reference voltage circuit 37. Because the L-level output voltage $V_{out1}$ is set lower than the reference voltage HI, the output of the comparator 36 becomes an H (high) level.

Consequently, the current source is supplied, via a diode 38 and a resistor R3, to the base of a transistor TR1, for turning the transistor TR1 on. This permits the power supply to energize a relay coil 39 of the relay, so that the switch 31 is held connected to the relay contact 32 by the electromagnetic force of the relay coil 39. Thus, even if the user removes his or her finger from the control switch, the motor 33 keeps rotating in the some direction.

When the window contacts the weather strip of the window frame, the load on the motor increases, and causes a lock current (overcurrent) to flow in the motor 33. The voltage across the resistor R1 increases accordingly. When this voltage becomes higher than the first reference voltage LO, the output voltage $V_{out1}$ of the comparator 34 becomes an H level. A capacitor 41 is charged with this H-level output voltage $V_{out1}$. When the charging of the capacitor 41 is complete, after about 0.7 second, the input voltage to the comparator 36 becomes higher than the reference voltage HI of the second reference voltage circuit 37. The output of the comparator 36 then becomes an L level, turns the transistor TR1 off, and causes the motor 33 to stop.

As described above, even when the window contacts the weather strip before it reaches the upper limit, causing the lock current to flow in the motor 33, the motor 33 does not stop immediately. The power supply to the motor is maintained for about 0.7 second after the increase in the load on the motor, so that the window can reach its upper limit.

On the other hand, with the switch 31 coupled to a relay contact 42, when the switch 43 is connected to a relay contact 44, the current flows in the direction opposite to the one in the above case. In this case, the motor 33 rotates in the direction to lower the window. Like in the previous case, the motor 33 stops running after about 0.7 second after the lock current flows in the motor 33, so that the window moves down to the lower limit.

Since the controller 30 includes many circuits, such as the reference voltage circuits 35 and 37, the comparators 34 and 36 and the transistor TR1, however, it has a complicated troublesome design, it is costly and the controller is relatively large in size.

SUMMARY OF THE INVENTION

It is therefore an object of the present invention to provide an automatic motor stop controller which overcomes the foregoing problems, and which has a simpler circuit design for making the entire controller more compact, and for reducing the manufacture cost.

To achieve this object, an automatic motor stop controller is equipped with a motor which is driven by a power source. A switch is provided between the motor and the power source to connect them or disconnect them from each other. A relay coil is connected to the motor. When the motor is connected to the power source by the switch, the relay coil holds the switch in an on state. When an overcurrent flows in the motor, a current-limiting thermistor restricts the current flowing across the relay coil to disconnect the switch, for causing the motor to automatically stop.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

A preferred embodiment of the present invention as embodied into a window regulator in a vehicle door, will be described below referring to the accompanying drawings.

Figure 1:
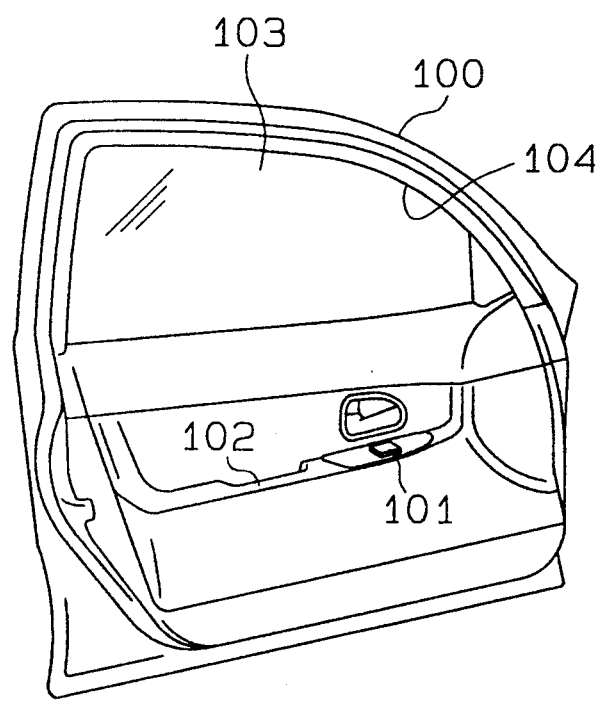
FIG. 1 is a schematic diagram illustrating a door of a vehicle having a window regulator embodying the present invention.

A car door 100 shown in FIG. 1 is provided with a window regulator having a control switch mechanism 101 mounted on an armrest 102. By pushing or pressing an end of the switch mechanism 101, the window regulator causes glass panel 103 to be raised or lowered, for closing or opening a window 104.

Figure 2:
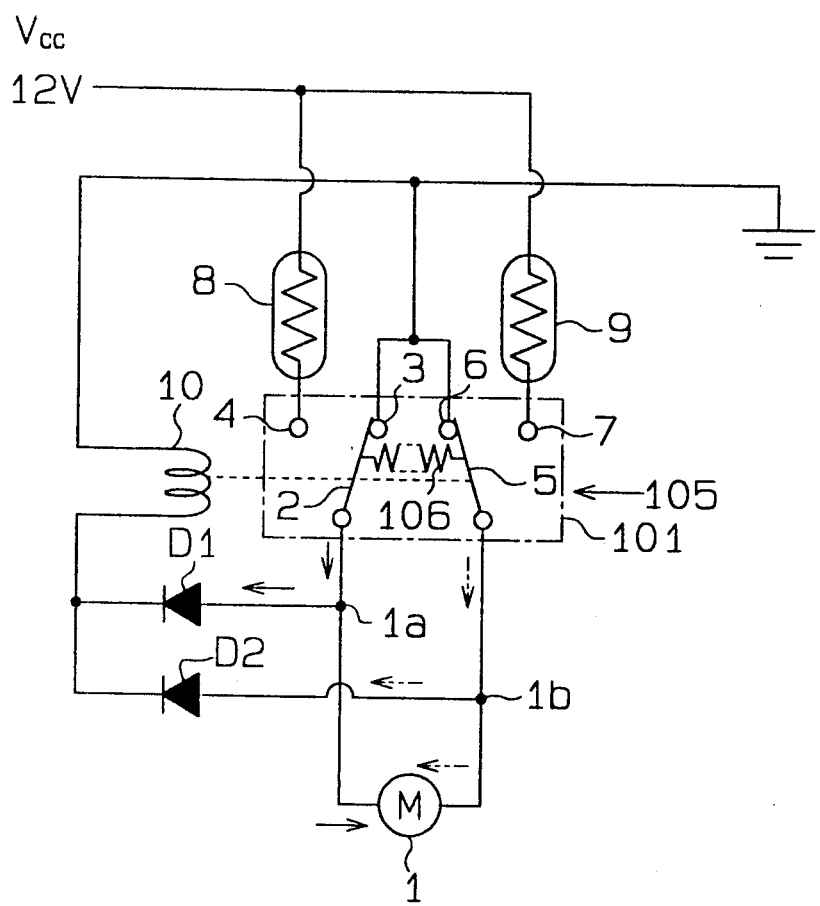
FIG. 2 is a circuit diagram of the window regulator of FIG. 1.

The window regulator is provided with a motor 1, as shown in FIG. 2. The motor 1 is connected to a power source $V_{cc}$, via a relay 105 which includes the aforementioned control switch mechanism 101. The relay 105 has two pairs of relay contacts 3, 4, and 6, 7, and two switches 2 and 5. The switch 2 corresponds to the relay-contact pair 3, 4, and the switch 5 corresponds to the relay-contact pair 6, 7. The relay contacts 4 and 7 are connected to the power source $V_{cc}$, via first and second thermistors 8 and 9, respectively. The relay contacts 3 and 6 are grounded. The switches 2 and 5 are connected to terminals 1a and 1b of the motor 1, respectively. The switches 2 and 5 are normally connected to the respective relay contacts 3 and 6 by the urging force of a spring 106.

The relay 105 also has a relay coil 10 which has one end ground and the other end connected via a pair of diodes D1 and D2, to the terminals 1a and 1b of the motor 1. The diodes D1 and D2 are connected, in the forward bias direction, between the motor 1 to the coil 10.

By depressing one end of the control switch mechanism 101, one of the switches 2 or 5 is to its respective relay contact 4 or 7, against the force of the spring 106. When the relay coil 10 is energized, the induced magnetic force keeps the switch 2 or 5 connected to its respective relay contact 4 or 7. With the current supply to the relay coil 10 inhibited, when the control switch mechanism 101 is released, the switch 2 or 5 returns to its original position due to the urging force of the spring 106, and is connected back to its respective relay contact 3 or 6.

Each of the first and second thermistors 8 and 9 is a PTC (Positive Temperature Coefficient) thermistor, whose resistance increases when temperature rises. When the thermistors 8 and 9 are heated to about 90° C., their resistances rapidly increase. When an overcurrent flows across the thermistors 8 and 9, the thermistors are heated up and their resistances also increase rapidly.

The action of the window regulator will now be described below in greater detail. In order to lower the glass panel 103 for opening the window 104, the user depresses one end of the control switch mechanism 101. With the switch 2 is connected to the relay contact 3, the switch 5 is coupled to the relay contact 7. As a result, the current from the power source $V_{cc}$ flows across the second thermistor 9, motor 1, diode D2 and relay coil 10, as indicated by broken line arrows in FIG. 2. The motor 1 therefore runs in the forward direction to lower the glass panel 103 and the relay coil 10 is energized. The energized relay coil 10 produces an electromagnetic force to keep the switch 5 connected to the relay contact 7. Even when the depression of the control switch mechanism 101 is released, power is supplied to the motor 1, so that the glass panel 103 continues its downward movement.

When power to the motor 1 continues after the glass panel 103 reaches its lower limit, a lock current (overcurrent) flows in the motor 1. This lock current causes the second thermistor 9 to heat up. Consequently, the resistance of the second thermistor 9 increases, and interrupts the current supply to the motor 1 and relay coil 10. The electromagnetic force of the relay coil 10 decreases, and causes the switch 5 to be switched to the relay contact 6 due to the urging force of the spring 106. This switching action interrupts the power supply to the motor 1 for stopping it. The above operation automatically ends the lowering of the glass panel 103 to open the window 104.

In order to raise the glass panel 103 for closing the window 104, the other end of the control switch mechanism 101 is depressed. Then, with the switch 5 connected to the relay contact 6, the switch 2 is connected to the relay contact 4. As a result, the current from the power source $V_{cc}$ flows across the first thermistor 8, motor 1, diode D1 and relay coil 10. The motor 1 therefore runs in the reverse direction to raise the glass panel 103 and the relay coil 10 is energized. When the coil 10 is energized, the relay coil 10 generates an electromagnetic force which keeps the switch 2 connected to the relay contact 4. Even when the depression of the control switch mechanism 101 is released, power is supplied to the motor 1, for keeping the glass panel 103 rising.

When power is supplied to the motor 1 continues, after the glass panel 103 reaches its upper limit, a lock current (overcurrent) flows in the motor 1. This lock current causes the temperature of the first thermistor 8 to rise. As a result, the resistance of the first thermistor 8 increases, and interrupts the current flow across the motor 1 and relay coil 10. The electromagnetic force of the relay coil 10 becomes weaker, and causes the switch 2 to be switched to the relay contact 3, due to the urging force of the spring 106. This switching action cuts off the power supply to the motor 1, and stops the motor 1 from running. The above operation automatically terminates the upward movement of the glass panel 103 to close the window 104.

As is apparent from the foregoing description, this present design does not require any reference voltage circuit, comparator or transistor. It reduces the number of required diodes, and makes it possible to simplify the controller of the window regulator, to reduce its size and its manufacture cost.

In the present embodiment, the first and second thermistors 8 and 9 are of a type whose resistance sharply rises when the temperature of the thermistors rises to and exceeds 90° C. Thermistors whose resistances vary at different temperatures may however be used in accordance with the present embodiment.

Furthermore, the pair of thermistors 8, 9 is provided with respect to the forward and reverse directions of rotation of the motor 1. Therefore, the raising and lowering of the glass panel can be alternately performed by using either one of the thermistors, without having to wait for the previously used thermistor to cool.

Figure 3:
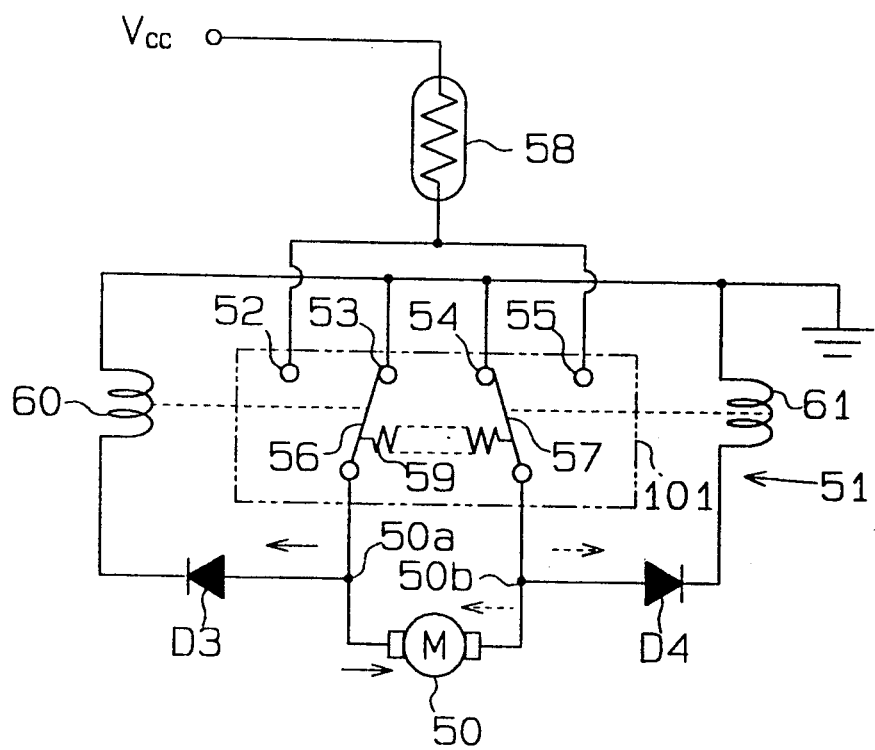
FIG. 3 is a circuit diagram of a modification of the window regulator of FIGS. 1 and 2.
Figure 4:
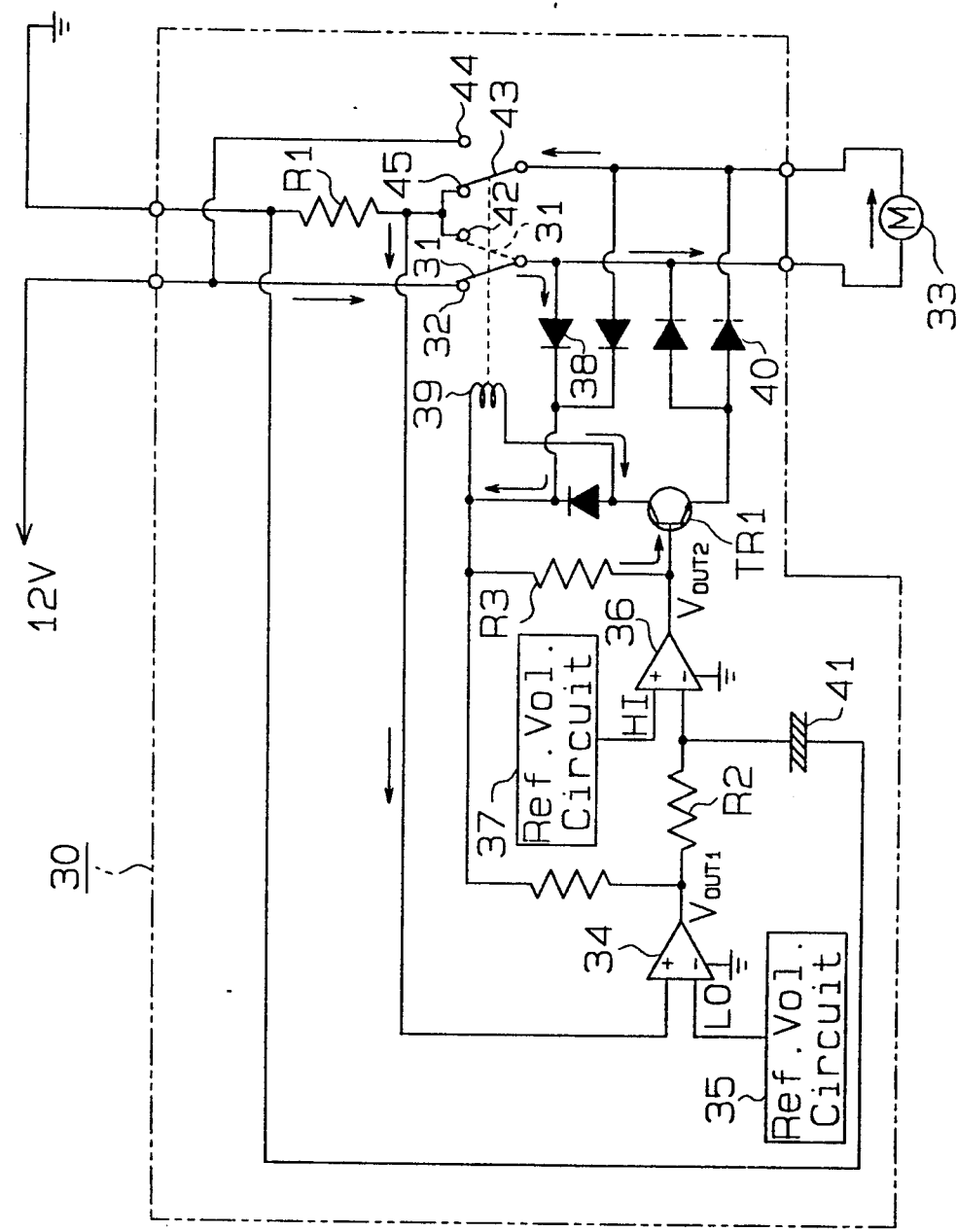
FIG. 4 is a circuit diagram of a conventional window regulator.

A modification of the window regulator embodying the present invention will now be described referring to FIG. 3.

A motor 50 of the window regulator is connected to a power source $V_{cc}$ via a switch 51 including the aforementioned control switch mechanism 101. The switch 51 has two pairs of contacts 52, 53 and 54, 55, and two switches 56 and 57. The switch 56 corresponds to the contact pair 52, 53, and the switch 57 corresponds to the contact pair 54, 55. The contacts 52 and 55 are connected to the power source $V_{cc}$ via a thermistor 58. The contacts 53 and 54 are grounded. The switches 56 and 57 are connected to terminals 50a and 50b of the motor 50, respectively. The switches 56 and 57 are normally connected to the contacts 53 and 54, respectively, by the urging force of a spring 59.

The switch 51 also has a pair of coils 60 and 61. Each of the coils 60 and 61 has one of its ends grounded, and the other end connected to the terminals 50a and 50b of the motor 50 respectively, via diodes D3 and D4. The diodes D3 and D4 are connected in the forward bias direction from the motor 50 to the coils 60 and 61.

By depressing one end of the control switch mechanism 101, one of the switches 56 and 57 is switched to the respective contact 52 or 55, against the urging force of the spring 59. When either coil 60 or 61 is supplied with a current, the induced magnetic force keeps the switch 56 or 57 connected to the respective contact 52 or 55. With the current supply to the coil 60 or 61 inhibited, when the control switch mechanism 101 is released, the switch 56 or 57 returns back to its original position, due to the urging force of the spring 106, to be connected again to the respective contact 52 or 55.

To lower the glass panel 103 for opening the window 104, one end of the control switch mechanism 101 is depressed. Then, with the switch 57 connected to the contact 54, the switch 56 is coupled to the contact 52. As a result, the current from the power source $V_{cc}$ flows across the thermistor 58, motor 50, diode D3 and coil 60 as illustrated in FIG. 3. The motor 50 therefore runs in the forward direction to lower the glass panel 103 and the coil 60 is energized. When the coil 60 is energized, it produces an electromagnetic force to keep the switch 56 connected to the contact 52. Even when the depression of the control switch mechanism 101 is released, power is supplied to the motor 50, so that the glass panel 103 continues its downward movement.

In this stage, the terminal 50b is connected to the ground through the switch 57 and the contact 54, and the diode D4 and the coil 61 are connected to ground potential. Therefore, a current does not flow through the diode D4 nor through the coil 64.

When power is supplied to the motor 50 after the glass panel 103 reaches its lower limit, a lock current (overcurrent) flows in the motor 50. This lock current causes the temperature of the thermistor 58 to rise. Consequently, the resistance of the thermistor 58 increases, and interrupts the current flow across the motor 50 and coil 60. The electromagnetic force of the coil 60 is reduced accordingly, thus causing the switch 56 to be switched to the contact 53 under the force of the spring 59. This switching action cuts off the power supply to the motor 50, and stops it from running. The above operation automatically ends the lowering of the glass panel 103 to open the window 104.

To raise the glass panel 103 for close the window 104, the other end of the control switch mechanism 101 is depressed. Then, with the switch 56 connected to the contact 53, the switch 57 is connected to the contact 55. As a result, the current from the power source $V_{cc}$ flows across the thermistor 58, motor 50, diode D4 and coil 61 as indicated by the broken line arrows in FIG. 3. The motor 50 therefore runs in the reverse direction, for raising the glass panel 103. The coil 61 is energized, and it generates an electromagnetic force, for keeping the switch 57 connected to the contact 55. Even when the depression of the control switch mechanism 101 is released, power is supplied to the motor 50, to maintain the upward movement of the glass panel 103.

When power is supplied to the motor 50 after the glass panel 103 reaches its upper limit, a lock current (overcurrent) flows in the motor 50. This lock current causes the temperature of the thermistor 58 to rise. Consequently, the resistance of the thermistor 58 increases, and interrupts the current flow across the motor 50 and coil 61. The electromagnetic force of the coil 61 becomes weaker, and causes the switch 57 to be switched to the contact 54 under the force of the spring 59. This switching action cuts off the power supply to the motor 50, and stops it from running. The above operation automatically terminates the upward movement of the glass panel 103 to close the window 104.

In the above modification, the coils 60 and 61 are provided to correspond to the switches, respectively. Therefore, it is not necessary to use a relay switch such as the relay 105.

In the above-described embodiment and modification thereof, the present invention is embodied in a window regulator for a vehicle. The present invention may however be applied to controllers which control the following motor operated accessories:

1) An apparatus for use with a motor for causing the vehicle top roof to slide forward and backward.

2) An apparatus for use with a motor for causing a seat in a vehicle to slide or move forward and backward.

3) An apparatus for adjusting the reclining angle of the seat back.

In each of these above accessories, the controller is designed so that after a particular item, such as the top roof has reached its limit, a lock current flows in the motor.

When the conventional automatic motor stop controller is used with the above devices when the car seat is reclined with various objects placed on it, these objects interfere with the free movement of the seat back. The objects may be deformed or damaged. By using the present invention, such damage is preventable.

The present example and embodiment are to be considered as illustrative and not restrictive, and the invention is not to be limited to the details given herein, but may be modified within the scope of the appended claims.

What is claimed is:

1. An automatic controller for controlling an electric current between a motor and a power source, comprising:

switching means, for connecting the motor to the power source and for disconnecting the motor from the power source;

latch means, connected to the motor, being energized to hold said switching means in a latched position, in response to current flow from the power source;

means, connected to the power source, for interrupting current flow in said latch means and in the motor, to cause said switching means to disconnect the motor, when an increased current overdraw of the motor is senses; and wherein current flow in said motor is interrupted by said current interrupting means when increased current overdraw of the motor is sensed, and said switching means is released from the latched position and the current flow to the motor is stopped when the current flow in said latch means reaches a predetermined current level, in response to a current interruption signal from said current interrupting means.

2. The automatic controller according to claim 1k, wherein said switching means includes a pair of switches interconnected between the motor and the power source;

a spring which acts on said pair of switches to disconnected the motor from the power source;

said latch means comprises a pair of coils respectively associated with said pair of switches;

wherein, when one of said pair of switches is activated, current is supplied to energize one of said pair of coils corresponding to said activated switch; and wherein said activated switch is latched in an activated state against the force of said spring.

3. The automatic controller according to claim 2, wherein said latch means comprises a single coil which, when energized, after one of said pair of switches is activated, holds said activated switch in said latched position against the force of said spring.

4. The automatic controller according to claim 1, wherein said current interrupting means comprises a pair of thermistors each of which having a corresponding variable resistance;
wherein said corresponding variable resistance increases as the temperature of said thermistor rises; and
wherein said pair of thermistors are connected between the power source and said switching means.

5. The automatic controller according to claim 1, wherein the motor is capable of rotating in a forward and a reverse directions.

6. The automatic controller according to claim 5, wherein said current interrupting means comprises a first and second thermistors;
wherein a current flows through said first thermistor when the motor is rotated in the forward direction; and
wherein a current flows through said second thermistor when the motor is rotated in the reverse direction.

7. The automatic controller according to claim 1, for use in a window regulator of a vehicle, for controlling the sliding movement of a window.

8. The automatic controller according to claim 7, wherein said window regulator has a control switch mechanism for controlling said switching means.

9. An automatic controller for controlling an electric current between a motor and a power source, comprising:
switching means, for connecting the motor to the power source and for disconnecting the motor from the power source;
latch means, connected to the motor, being energized to hold said switching means in a latched position, in response to current flow from the power source;
means, connected to the power source, for interrupting current flow in said latch means and in the motor, to cause said switching means to disconnect the motor, when an increased current overdraw of the motor is sensed;
said current interrupting means including at least one thermistor;
wherein said switching means includes a pair of switches interconnected between the motor and the power source;
wherein said current interrupting means comprises a pair of thermistors, each of which having a corresponding resistance which is variable as a function of the temperature of said thermistor, and
wherein current flow in said motor is interrupted by said current interrupting means when increased current overdraw of the motor is sensed, and said switching means is released from the latched position and the current flow to the motor is stopped when the current flow in said latch means reaches a predetermined current level, in response to a current interruption signal from said current interrupting means.

10. The automatic controller as recited in claim 9, for use in a window regulator of the vehicle, to control the sliding movement of the window.

11. The automatic controller according to claim 10, wherein

12. The automatic controller according to claim 9, wherein:
the motor is capable of rotating in a forward and a reverse directions;
said switching means comprises a first switch for causing the motor to rotate in the forward direction, and a second switch for causing the motor the rotate in the reverse direction; and
said latch means includes a first coil for holding said first switch in a predetermined position, and a second coil for holding said second switch in a predetermined position.

13. The automatic controller according to claim 1, wherein said current interrupting means comprises a single thermistor having a variable resistance;
wherein said variable resistance increases as temperature rises; and
wherein said thermistor is connected between the power source and said switching means.

14. The automatic controller according to claim 1, wherein said current interrupting means comprises a pair of thermistors connected in series with the motor and said coils.

15. The automatic controller according to claim 1, wherein said current interrupting means comprises a pair of thermistors connected in series with a parallel circuit including the motor and said energized coil.

* * * * *